Nov. 26, 1963  C. VAN DER LELY  3,111,802
SIDE DELIVERY RAKES
Filed May 16, 1960  2 Sheets-Sheet 1
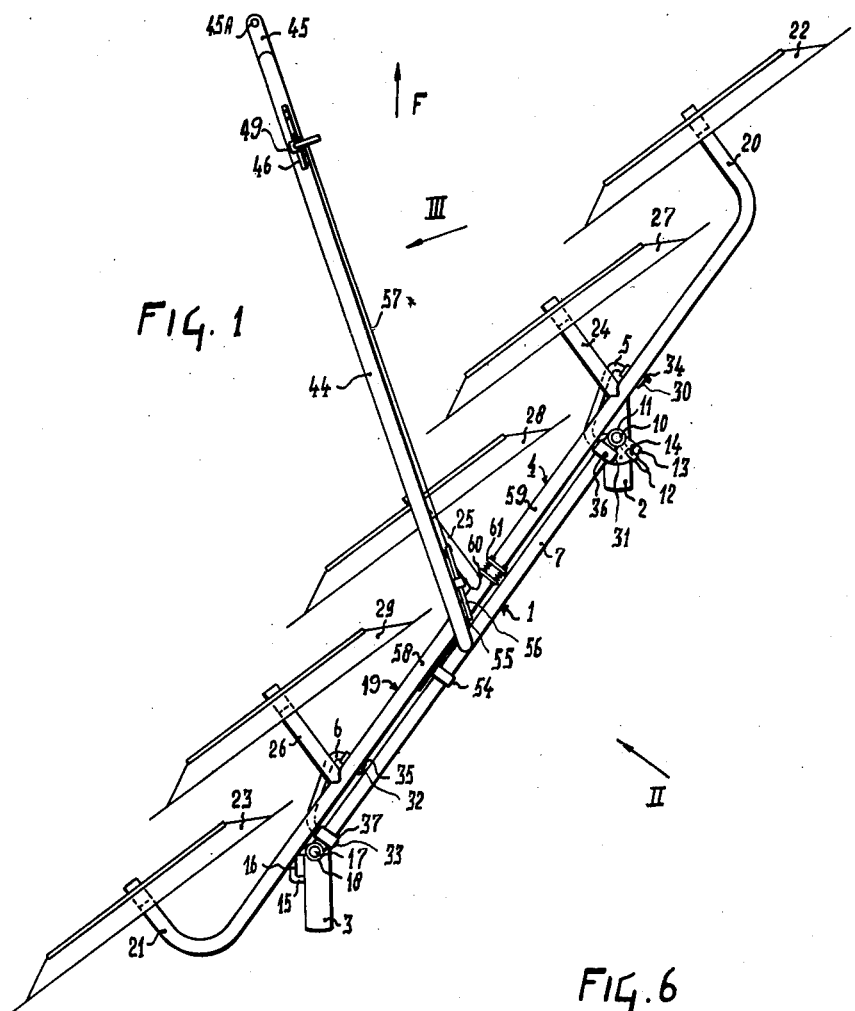
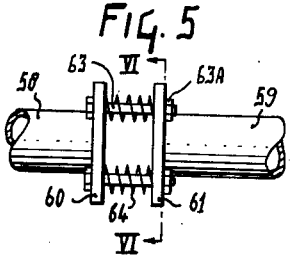
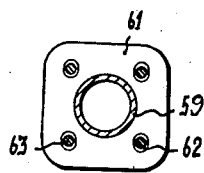
INVENTOR.
Cornelis van der Lely
BY
Mason, Mason & Albright Nov. 26, 1963     C. VAN DER LELY     3,111,802
SIDE DELIVERY RAKES
Filed May 16, 1960     2 Sheets-Sheet 2
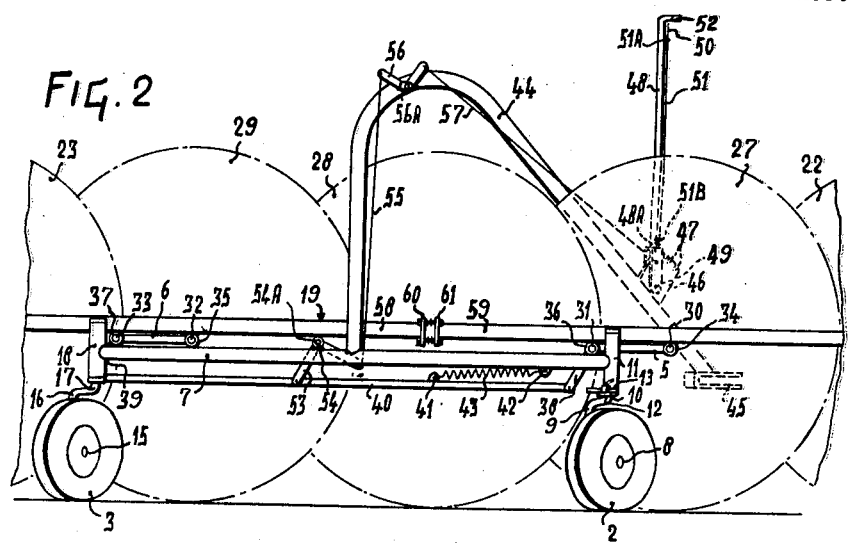
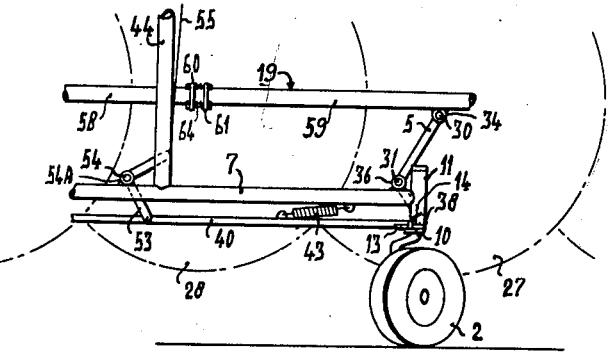
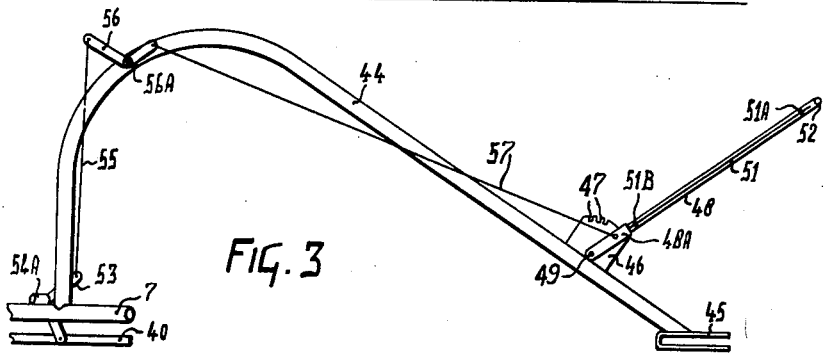
INVENTOR.
CORNELIS VAN DER LELY
BY
Mason, Mason & Albright United States Patent Office 3,111,802
Patented Nov. 26, 1963

3,111,802
SIDE DELIVERY RAKES
Cornelis van der Lely, Zug, Switzerland, assignor to Patent Concern N.V., Willemstad, Curacao, Netherlands Antilles, a limited-liability company of the Netherlands Antilles
Filed May 16, 1960, Ser. No. 29,279
Claims priority, application Netherlands June 10, 1959
11 Claims. (Cl. 56—377)

This invention relates to a side delivery rake of a first kind comprising a frame supported upon ground wheels, and carrying a plurality of rake wheels in such a manner that when the rake is in operation, the rake wheels rotate and laterally displace crop lying on the ground.

The present invention has for its object to provide a side delivery rake having rake wheels which are carried by the frame in such a way that they are vertically adjustable in a simple manner, the rake being of simple and light construction. According to a first aspect of the present invention, there is provided a side delivery rake of the first kind set forth, wherein the implement comprises a first frame which is supported upon the ground wheels, and a second frame on which the rake wheels are mounted, the first and second frames being located wholly or mainly behind the rake wheels (with reference to the intended direction of travel of the side delivery rake) and the second frame being connected to the first frame in such a manner as to be displaceable vertically or substantially vertically with respect thereto, the arrangement being such that the second frame is fixable in a plurality of positions in relation to the first frame.

This invention also relates to an implement for laterally displacing crop lying on the ground, of a second kind comprising a frame supported upon ground wheels and carrying a plurality of rake wheels in such a manner that when the implement is in operation, the rake wheels rotate and laterally displace the crop. According to a second aspect of the present invention, there is provided an implement of the second kind set forth, wherein the implement comprises a first frame which is supported upon the ground wheels, and a second frame on which the rake wheels are mounted, the second frame being connected to the first frame in such a manner as to be displaceable vertically or substantially vertically with respect thereto, and wherein the second frame includes a beam consisting of two aligned portions which are connected so as to be displaceable against resilient opposition towards each other.

For a better understanding of the invention and to show how the same may be carried into effect, reference will now be made by way of example to the accompanying drawings, in which:

FIGURE 1 is a plan view of a side delivery rake,

FIGURE 2 is an enlarged elevational view of the side delivery rake shown in FIGURE 1, as seen in the direction of the arrow II in FIGURE 1, FIGURE 3 is an elevational view of a part of the side delivery rake shown in FIGURE 1, as seen in the direction of the arrow III in FIGURE 1, FIGURE 4 is a view similar to FIGURE 2 of a part of the side delivery rake shown in FIGURE 1, the rake being shown in an inoperative position, FIGURE 5 shows, on an enlarged scale, a detail of the side delivery rake shown in FIGURE 1, and FIGURE 6 is a section of the detail shown in FIGURE 5, taken on the line VI—VI.

Referring now to FIGURES 1, 2 and 3, the side delivery rake has a first frame 1, which is supported by ground wheels 2 and 3, and a second frame 4, which is connected to the first frame with the aid of links 5 and 6. The first frame 1 includes a main frame beam 7, to the ends of which the ground wheels 2 and 3 are connected. The ground wheel 2 is freely rotatable about a horizontal axle 8, which is connected to a vertical shaft 10 by a supporting arm 9. The vertical shaft 10 is journalled in a sleeve 11, secured to the main frame beam 7. An arm 12 is secured to the vertical shaft 10, and a sector-shaped plate 13 is secured to the sleeve 11. The sector-shaped plate 13 has a series of holes, and the arm 12 has a single hole to correspond with any one of the holes in the plate 13. By inserting a locking pin 14 through the hole in the arm 12 and a corresponding hole in the sector-shaped plate 13, the ground wheel 2 can be fixed in one of a number of positions relative to the first frame 1. By turning the ground wheel 2 about the axis of the vertical shaft 10, the direction of travel (and hence the working width) of the side delivery rake can be adjusted. The ground wheel 3 is freely rotatable about a horizontal axle 15, which is connected by a supporting arm 16 to a vertical shaft 17. The vertical shaft 17 is journalled in a sleeve 18, secured to the main frame beam 7. The axes of the horizontal axle 15 and the vertical shaft 17 do not intersect, and thus the ground wheel 3 is a free caster wheel.

The second frame 4 includes a beam 19, the ends 20 and 21 of which are bent and are substantially parallel. Rake wheels 22 and 23 are arranged upon the ends 20 and 21 respectively, so that such ends serve as supports for the rake wheels. Between the bent ends 20 and 21 of the beam 19, arms 24, 25 and 26 constituting further supports, are fixed to the beam, and rake wheels 27, 28 and 29 respectively are arranged on these arms. The bent ends 20 and 21, and the supporting arms 24, 25 and 26, are located in a substantially horizontal plane, and the rake wheels 22, 23, 27, 28 and 29 are arranged so as to be freely rotatable about the axles of the members 20, 21, 24, 25 and 26 respectively. The rake wheels preferably have circumferential, resilient tines or like crop-engaging members, since such tines may deflect when the side delivery rake is in operation in order to accommodate ground irregularities.

The links 5 and 6, which connect the first frame 1 to the second frame 4, have horizontal parallel pivots 30, 31 and 32, 33 respectively. The pivots 30 and 32 are journalled in bearings 34 and 35 respectively, which are secured to the beam 19 of the second frame 4 and the pivots 31 and 33 are journalled in bearings 36 and 37 which are secured to the main frame beam 7 of the first frame 1. The bearings 34–37 are secured to the first and the second frame parts in such a manner that the pivots 30 and 32 are displaced away from the pivots 31 and 33 respectively, obliquely relative to first frame 1. Arms 38 and 39 are fixed to the links 5 and 6 respectively, and the arms 38 and 39 are interconnected by a coupling rod 40 which is pivotally attached to the free ends of the arms. Perforated lugs 41 and 42 are welded to the coupling rod 40 and the main frame beam 7 respectively, and a spring 43 is arranged between these lugs.

A draw-arm 44 is fixed to the main frame beam 7 of the first frame 1, and extends over the rake wheels. The draw-arm 44 has at its free end a coupling fork 45, so that the side delivery rake may be attached to a tractor or similar propelling vehicle with the aid of a pin passed through apertures 45A formed in the fork, and through an aperture in the towing bracket of the tractor or the like. Near the coupling fork 45, a vertical plate 46 is secured to the draw-arm 44, the vertical plate having notches 47 formed in its upper edge. A control member in the form of a lever 48 having a bifurcated end 48A, is arranged on the plate 46 so as to be turnable about a pivot pin 49. A pawl (not shown) is arranged in the end 48A of the lever 48 in known manner, the pawl being urged with the aid of a spring (not shown) into a corresponding notch 47 in the plate 46, so that the pawl locks the lever in a fixed position in relation to the plate. A rod 51, having a bent end 50, is passed through perforated lugs 51A and 51B welded to the lever 48, the lower end of the rod being fixed to the pawl. With the aid of the rod 51, the pawl may be lifted out of a notch 47 in the plate 46, and the lever 48 may then be moved to a further position in relation to the plate 46. On releasing the rod 51, the spring will urge the pawl into a corresponding notch 47 in the plate 46. The bent end 50, which serves as a handle for movement of the rod 51, is located near to a handle 52 fixed to the upper end of the lever 48. The handle 52 is located within the reach of the driver of the tractor or the like when the side delivery rake is attached to such tractor or the like with the aid of the draw-arm 44. Hence the driver may grip manually the bent end 50 and the handle 52 in order to move the lever 48 from one position to another in relation to the plate 46.

A bell-crank lever 53 is turnable about the axis of a shaft 54 journalled in a sleeve 54A which is welded to the main frame beam 7. The free end of one limb of the bell-crank lever 53 is pivotally attached to the coupling rod 40. The free end of the other limb of the bell-crank lever 53 is connected by a coupling member 55 in the form of a rod, chain or cable, to the free end of one limb of a further bell-crank lever 56, which is turnable about the axis of a shaft journalled in a sleeve 56A welded to the draw-arm 44. The bell-crank lever 56 is in turn connected by a similar coupling member 57 to the lever 48. On turning the lever 48 about the pivot pin 49, the bell-crank levers 56 and 53 will be caused to turn upon their respective shafts, and as the bell-crank lever 53 turns, the coupling rod 40 is displaced longitudinally. Since the coupling rod 40 is fixed to the links 5 and 6 with the aid of the arms 38 and 39, the longitudinal displacement of the coupling rod 40 causes the links 5 and 6 to turn in unison, so that the second frame 4 is moved vertically or substantially vertically in relation to the first frame 1. As the lever 48 can be fixed in a number of positions in relation to the plate 46, the second frame 4, which is controlled by the lever 48, can also be fixed in a number of corresponding positions in relation to the first frame 1. FIGURE 4 shows a raised position of the second frame part, and the position of the lever 48 corresponding to this raised position is illustrated in FIGURE 3. The spring 43, which is arranged between the coupling rod 40 and the main frame beam 7 of the first frame 1, tends to move the coupling rod 40 in such a direction as to raise the second frame 4 in relation to the first frame 1. Hence the spring acts so as to reduce the pressure of the rake wheels on the ground.

In the position shown in FIGURE 4, the rake wheels are raised clear of the ground, so that the side delivery rake may be easily transported. If the coupling members 55 and 57 are constituted by cords or chains, and the lever 48 is fixed in position, the lowest position of the second frame 4 is fixed in relation to the first frame 1, but the second frame part is capable of moving up and down above such lowest position by virtue of the cords or chains. Hence the rake wheels, which are mounted on the second frame part, may move up and down in order to accommodate ground irregularities during the operation of the side delivery rake. If the pawl in the lever 48 is fixed in an in-operative position, the lever 48 is freely turnable about the pivot pin 49, and so the second frame 4 is freely movable with respect to the first frame part 1.

The beam 19 of the second frame 4 consists of two portions 58 and 59, of substantially equal length, which portions are joined to each other by a resilient coupling which is shown in more detail in FIGURES 5 and 6. Referring now to FIGURES 5 and 6, the portion 58 has secured thereto a perforated flange 60, and the portion 59 a similar flange 61. The flange 61 has four holes 62 formed therein, and the flange 60 also has four holes, corresponding to the holes 62. Four bolts 63 are passed through corresponding holes in the flanges 60 and 61 and are held in place by nuts 63A. Encircling each of the bolts 63, between the flanges 60 and 61, is a helical compression spring 64, the four springs tending to move the flanges away from each other. Since the diameter of the shanks of the bolts is less than the diameter of the holes in the flanges, the flanges are free to move with respect to each other, movement of the flanges towards each other being restrained by the springs 64. Consequently, the portions 58 and 59 of the second frame 4, on which the rake wheels are arranged, are movable relative to each other. This movement allows the rake wheels to accommodate irregularities in the ground. It will be appreciated that the construction shown in detail in FIGURES 5 and 6 could be applied not only to side delivery rakes, but also to other implements for laterally displacing crop lying on the ground.

In operation, the side delivery rake is coupled to a tractor or the like with the aid of the draw-arm 44, so that the rake may be towed in the direction indicated by the arrow F in FIGURE 1. The forward ground wheel 2 is adjusted about the axis of the vertical shaft 10 and is locked in a suitable position about the axis to produce the required width of raking. The rake wheels are lowered to the ground by disengaging the pawl from one of the notches 47 in the plate 6, moving the lever 48 to an appropriate position and locking it in such position with the aid of the pawl. The side delivery rake is then drawn in the direction of the arrow F and the rake wheels are rotated by virtue of their contact with the ground or the crop lying thereon or both. The first rake wheel 22 engages and displaces crop to the left (as seen in the direction of travel) in front of the following rake wheel 27, which in turn engages and displaces to the left such crop, together with other crop lying in its path. Thus the crop lying on a strip of land is engaged and passed from one rake wheel to the next succeeding rake wheel until it is deposited in the form of a windrow to the left of the last rake wheel 23.

What I claim is:

1. A side delivery rake which comprises a first frame part, ground engaging means connected to said first frame part, draft means connected to said first frame part, a second frame part, said second frame part disposed parallel to said first frame part, said second frame part pivotally connected to said first frame part, a plurality of rake wheels arranged in echelon on said second frame part, and adjustment means included in said rake defining selectively the minimum distance of said second frame part relative to the ground.

2. A side delivery rake which comprises a first frame part, ground engaging means connected to and supporting said first frame part, draft means interconnected to said first frame part, a second frame part, and said second frame part consisting of at least two beam portions which are yieldably coupled together in an end-to-end relationship, each of said beam portions being substantially parallel to said first frame part and pivotally connected thereto, and a plurality of rake wheels arranged in echelon along said second frame part.

3. A side delivery rake which comprises a first frame part, ground-engaging means connected to said first frame part, draft means connected to said first frame part, a second frame part, said second frame part disposed parallel to said first frame part, parallel links, said second frame part pivotally connected to said first frame part by said parallel links, a plurality of rake wheels arranged in echelon on said second frame part, and adjustment means included in said rake defining selectively the minimum distance of said second frame part relative to the ground.

4. A side delivery rake, in accordance with claim 3, having a coupling rod interconnecting said links whereby movement in one link produces a corresponding movement in the other link.

5. A side delivery rake which comprises a first frame part, ground-engaging means connected to said first frame part, draft means connected to said first frame part, a second frame part, said second frame part disposed parallel to said first frame part, parallel links, said second frame part pivotally connected to said first frame part by said parallel links, a plurality of rake wheels arranged in echelon on said second frame part, a coupling rod interconnecting said links whereby movement in one of said links produces a corresponding movement in the other of said links, and a control member connected to said coupling rod, actuation of said control member causing said coupling rod to move whereby the minimum distance of said second frame part relative to the ground is selectively adjustable.

6. A side delivery rake in accordance with claim 5 wherein said control member comprises a lever, a pivot pin fixed in relation to said first frame part about which said lever is turnable and connection means connecting said lever to said coupling rod.

7. A side delivery rake which comprises a first frame part, ground-engaging means connected to said first frame part, draft means connected to said first frame part, a second frame part, said second frame part disposed parallel to said first frame part, parallel links, said second frame part pivotally connected to said first frame part by said parallel links, a plurality of rake wheels arranged in echelon on said second frame part, a coupling rod interconnecting said links whereby movement of one of said links produces a corresponding movement in the other of said links, a control member connected to said coupling rod, said control member arranged on said draft means at a location near the forward end thereof whereby, when the side delivery rake is connected to a tractor, said control member may be actuated by a driver of said tractor to actuate said coupling rod and selectively define the distance of said second frame part relative to the ground.

8. A side delivery rake which comprises a first frame part, ground-engaging means connected to said first frame part, draft means connected to said first frame part, a second frame part, said second frame part disposed parallel to said first frame part, said second frame part pivotally connected to said first frame part, a plurality of rake wheels arranged in echelon on said second frame part, spring means interposed between said first frame part and said second frame part, said spring means tending to raise said second frame part, and adjustment means included in said rake defining selectively the minimum distance of said second frame part relative to the ground.

9. A side delivery rake which comprises a first frame part, ground-engaging means connected to and supporting said first frame part, draft means interconnected to said first frame part, a second frame part, said second frame part consisting of at least two beam portions which are yieldably coupled together in an end-to-end relationship, each of said beam portions being substantially parallel to said first frame part and pivotally connected thereto, resilient means interconnecting said beam portions where they are coupled together, said resilient means providing resilient opposition against displacement of said beam portions, and a plurality of rake wheels arranged in echelon along said second frame part.

10. A side delivery rake in accordance with claim 9 wherein said resilient means comprises a plurality of springs disposed parallel to the longitudinal axes of said beam portions.

11. A side delivery rake in accordance with claim 10 having flanges fixed to adjacent ends of said beam portions, said springs being disposed between said flanges, bolts joining said flanges whereby said flanges are movable along said bolts toward or away from each other.

References Cited in the file of this patent
UNITED STATES PATENTS 2,837,888     Van der Lely et al. _____ June 10, 1958

FOREIGN PATENTS 1,151,940     France _____ Aug. 26, 1957